United States Patent [19]

Buckingham et al.

[11] Patent Number: 5,695,551
[45] Date of Patent: Dec. 9, 1997

[54] WATER REPELLENT COMPOSITION

[75] Inventors: Anne Marie Buckingham; Tara Nicole Estes; Michael Bradley Gee; David Brian Selley, all of Midland; Janet Mary Smith, Bay City, all of Mich.

[73] Assignee: Dow Corning Corporation, Midland, Mich.

[21] Appl. No.: 761,882

[22] Filed: Dec. 9, 1996

[51] Int. Cl.$^6$ ................................. C09K 3/18
[52] U.S. Cl. ................ 106/2; 106/244; 106/285; 106/287.13; 106/287.14; 106/287.15; 106/287.16; 524/804; 528/12
[58] Field of Search ................ 106/2, 287.13, 106/287.14, 287.15, 287.16, 285, 244; 524/804; 528/12

[56] References Cited

U.S. PATENT DOCUMENTS

| | | | |
|---|---|---|---|
| 3,015,637 | 1/1962 | Rauner | 525/444.5 |
| 3,284,384 | 11/1966 | Parker | 528/26.5 |
| 4,846,886 | 7/1989 | Fey | 106/2 |
| 4,874,431 | 10/1989 | Fey | 106/2 |
| 5,051,129 | 9/1991 | Cuthbert | 106/2 |
| 5,073,195 | 12/1991 | Cuthbert | 106/2 |
| 5,074,912 | 12/1991 | Liles | 106/2 |
| 5,110,684 | 5/1992 | Cooper | 428/447 |
| 5,205,860 | 4/1993 | Narula | 106/2 |
| 5,209,775 | 5/1993 | Bank | 106/2 |
| 5,225,510 | 7/1993 | Bank | 528/12 |
| 5,300,327 | 4/1994 | Stark | 427/387 |
| 5,421,866 | 6/1995 | Stark | 106/2 |

*Primary Examiner*—Anthony Green
*Attorney, Agent, or Firm*—James L. Decesare

[57] ABSTRACT

A composition is formed by combining water with an organic polymer such as polybutylene or an alkyd resin, and an alkoxysilane of the formula $R_nSi(OR')_{4-n}$ where R is an alkyl radical of 1–10 carbon atoms, an alkenyl radical having 2–8 carbon atoms, phenyl, chloropropyl, or trifluoropropyl, n is 1 or 2, and R' is an alkyl radical having 1–6 carbon atoms. The composition is free of amine or quaternary ammonium functional silanes. It can be emulsified and used to treat a cellulosic or masonry surface to render it water repellent.

10 Claims, No Drawings

WATER REPELLENT COMPOSITION

CROSS-REFERENCE TO RELATED APPLICATIONS

This application is related to U.S. Pat. No. 5,421,866, issued Jun. 6, 1995, entitled "Water Repellent Compositions" The '866 patent is assigned to the same assignee as the present invention.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to water repellent compositions containing organosilicon compounds and organic polymers such as polybutylene or an alkyd resin.

What we have unexpectedly discovered is an improvement in water repellent compositions according to the '866 patent. In the '866 patent, water repellents require as essential ingredients (i) an alkoxysilane, (ii) a silane coupling agent, (iii) polybutylene, and (iv) water. The silane coupling agent in the '866 patent is an amine or quaternary ammonium functional silane.

Silanes (i) and (ii) are employed in a molar ratio of about 0.5:1 to 3:1. The silanes are introduced as a cold blend, but are preferably first reacted with limited water, i.e., less than stoichiometric, to form a partial hydrolyzate containing an alcohol, i.e., R'OH, formed as a byproduct of the hydrolysis reaction. Thus, when alkoxysilane (i) and silane coupling agent (ii) are mixed together in the presence of water, a reaction product is formed.

Quite to our surprise, however, is the fact that when the silane (ii) containing reactive amino or quaternary ammonium functional groups in the '866 patent is eliminated, significant improvements can be realized in water repellent effectiveness (WRE), water exclusion (WE), water repellency (WR), water absorption (WA), and beading.

Thus, while water repellent compositions according to our invention are similar to those taught in the '866 patent, our water repellent compositions are "free of amine or quaternary ammonium functional silanes", a component taught to be essential in the invention of the '866 patent.

BRIEF SUMMARY OF THE INVENTION

Our invention relates to a water repellent composition that is free of amine or quaternary ammonium functional silanes. The composition contains 0.1–70 percent by weight of an organic polymer such as polybutylene or an alkyd resin; 0.1–70 percent by weight of an alkoxysilane $R_nSi(OR')_{4-n}$; the remainder of the composition to one hundred percent by weight being water. Preferably, the combined amount of organic polymer and alkoxysilane should total at least 3.0 percent by weight of the composition.

The composition can include as optional components 0–70 preferably 3–70 percent by weight of an organic wax; 0–70 preferably 3–70 percent by weight of a polysiloxane; 0–20 preferably 0.1–20 percent by weight of a beading agent; 0–2 preferably 0.1–2 percent by weight of a catalyst; a solvent in an amount to provide the composition with a content of volatile organic compound (VOC) of less than about 600 grams per liter; 0–10 preferably 0.1–10 percent by weight of a surfactant; and 0–1 preferably 0.1–1 percent by weight of each of a preservative, an antifoam agent, a mildewcide, and a UV absorber/UV light stabilizer.

These and other features and objects of the invention will become apparent from a consideration of the detailed description.

DETAILED DESCRIPTION OF THE INVENTION

One organic polymer suitable for our invention is a polybutylene polymer or oligomer having a number average molecular weight (MW) of about 200–2,300, preferably less than about 1,500, and most preferably less than about 1,000. Such polymers and oligomers are known in the art, and many are available commercially in a variety of molecular weights and end group combinations. It has been found that relatively low molecular weight polybutylenes, i.e., MW<1,000 having terminal groups which hydrogen bond to hydroxyl groups generally found on cellulosic or masonry substrates, provide particularly superior water repellent compositions in our invention. Thus, preferred polybutylene polymers have at least one terminal group which contain a functional group such as epoxy, halide, alkoxyphenylene, hydroxyl, carboxyl, chlorosilyl, isocyanato, amino, or amido. A highly preferred end group is the epoxy group.

The other organic polymer suitable for our invention is an alkyd resin including alkyd resins classified as oil based, such as long oil alkyd resins (i.e., containing more than 55 percent by weight of fatty acid oil), medium oil alkyd resins (i.e., containing 35–55 percent by weight of fatty acid oil), and short oil alkyd resins (i.e., containing less than 35 percent by weight of fatty acid oil), generally defined by their phthalic content; and oil type alkyd resins such as tall oil fatty acid (TOFA) alkyd resins, soybean oil (SOYA) alkyd resins, linseed oil alkyd resins, vegetable oil alkyd resins, marine oil alkyd resins, coconut oil alkyd resins, and castor oil alkyd resins.

Modified alkyd resins can also be used, such as rosin modified alkyd resins, phenolic modified alkyd resins, rosin-phenolic modified alkyd resins, hydrocarbon modified alkyd resins, and styrene modified alkyd resins. The alkyd resins can be solvent based alkyd resins, water dispersible alkyd resins, water soluble monomer modified alkyd resins, or air dried alkyd resins.

Representative alkyd resins are sold under the tradenames Arolon, Aroplaz, Beckosol, and Kelsol, by Reichhold Chemicals, Inc., Durham, N.C.

Most preferred alkyd resins according to our invention are the medium oil alkyd resins, the soybean oil (SOYA) alkyd resins, and the tall oil fatty acid (TOFA) alkyd resins, because of their exterior durability and color stability Also included herein are silicone modified alkyd resins, representative examples of which are described in U.S. Pat. No. 3,015,637 (Jan. 2, 1962) and U.S. Pat. No. 3,284,384 (Nov. 8, 1966). The '637 patent and the '384 patent also contain more detail on alkyd resins in general. Alkyd resins are described in even greater detail, for the interested reader, in the *Encyclopedia of Polymer Science and Engineering*, Volume 1, Second Edition, Pages 644–679, John Wiley & Sons, (1985); and in the *Kirk-Othmer Encyclopedia of Chemical Technology*, Volume 2, Fourth Edition, Pages 53–85, John Wiley & Sons, (1992); both of which are considered incorporated herein by reference. Thus, the term "alkyd resin" herein refers to reaction products of polyhydric alcohols and polybasic acids, i.e., polyesters, but polyesters containing monobasic acids such as long chain fatty acids.

The alkoxysilane can be a single alkoxysilane, or a mixture of alkoxysilanes can be employed. The alkoxysilane has the formula $R_nSi(OR')_{4-n}$. R can be an alkyl radical of 1–10 carbon atoms, preferably 1–6 carbons; an alkenyl radical having 2–8 carbon atoms; phenyl; chloropropyl; or trifluoropropyl n is 1 or 2; and R' is an alkyl radical having 1–6 carbon atoms. It is preferred, however, that R is a methyl or isobutyl radical, and that R' is a methyl or ethyl radical.

Some suitable alkoxysilanes are methyltrimethoxysilane (MTMS), methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane (IBTES), butyltriethoxysilane, hexyltrimethoxysilane, dimethyldimethoxysilane, dimethyldiethoxysilane, diethyldimethoxysilane, diisobutyldimethoxysilane, phenyltrimethoxysilane, dibutyldiethoxysilane, and dihexyldimethoxysilane.

Among optional ingredients that can be used according to our invention is an organic wax. The organic wax is preferably carnauba wax, or a blend of petroleum and synthetic waxes. More particularly, the organic wax is a blend which includes both paraffin and polyethylene waxes. The polyethylene waxes can be high or low density polyethylene waxes, or mixtures of high and low density polyethylene waxes. An exemplary organic wax, and an organic wax found to be especially suitable in accordance with our invention, is JONWAX® 125, a product and trademark of SC Johnson & Sons Inc., Racine, Wis. JONWAX® 125 is sold as an aqueous emulsion of polyethylene and paraffin waxes, with a solids content of about thirty-five percent. Other blended paraffin and polyethylene type waxes can also be employed.

Another optional ingredient that can be used according to our invention is a polysiloxane. One suitable polysiloxane is a silanol terminated polydimethylsiloxane of the structure $HOMe_2SiO(Me_2SiO)_xSiMe_2OH$ where Me is methyl and x typically varies from about 10 to about 1,000. In general, such silanol fluids have a viscosity ranging from about 15 to about 20,000 centistokes (mm²/s) measured at 25° C. The terminal silanols render these polydimethylsiloxane fluids susceptible to condensation under both mild acid and base conditions. When the end groups are exposed to moisture, a rapid crosslinking reaction can take place.

Examples of such silanol fluids are hydroxyl-terminated polydimethylsiloxanes having viscosities of 55–90 mm²/s measured at 25° C., and having a hydroxyl content of 1–2.5 weight percent; hydroxyl-terminated polydimethylsiloxanes having viscosities of 1,800–2,200 mm²/s measured at 25° C.; hydroxyl-terminated polydimethylsiloxanes having viscosities of 3,500–4,500 mm²/s measured at 25° C.; and polydimethylsiloxanes having viscosities of 11,000–14,000 mm²/s measured at 25° C., where 85–95 percent of the terminal groups are silanol, and 5–15 percent of the terminal groups are trimethylsiloxy.

Another suitable polysiloxane is a silicone resin. Most preferred are solvent solutions of hydroxyl-functional organosiloxane resin copolymers consisting essentially of $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of about 25:19:37:19, and having a hydroxyl content of about 0.5 percent by weight to about 3.0 percent by weight.

One specific silicone resin that can be used is a 1:1 xylene:toluene solution containing 50 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19, and having a hydroxyl content of 0.5 percent by weight.

Another specific silicone resin that can be used is a toluene solution containing 60 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19, and having a hydroxyl content of 3.0 percent by weight.

A third specific silicone resin that can be used is a xylene solution containing 50 percent by weight solids of a hydroxyl-functional organosiloxane resin copolymer with $CH_3SiO_{3/2}$ units, $(CH_3)_2SiO_{2/2}$ units, $C_6H_5SiO_{3/2}$ units, and $(C_6H_5)_2SiO_{2/2}$ units, in a molar ratio of 25:19:37:19.

Examples of other silicone resins that can be used are organosilicon resinous copolymers including $SiO_{4/2}$ units, and one or more $R_3SiO_{1/2}$ units, $R_2SiO_{2/2}$ units, and $RSiO_{3/2}$ units, in a molar ratio such that the number average molecular weight of the resinous copolymer is 1,200–10,000 dalton. R can be an alkyl radical with 1–6 carbon atoms; an aryl radical such as phenyl, tolyl, and xylyl; an alkenyl radical such as vinyl and allyl; or a trifluoropropyl radical.

Following are three (3) specific resinous copolymers which can be used:

I. An organic solvent soluble (i.e., preferably benzene) resin copolymer of triorganosiloxy units $R_3SiO_{1/2}$ and $SiO_{4/2}$ units in the mole ratio of 0.7 moles of triorganosiloxy units per mole of $SiO_{4/2}$ units. R has the meaning defined above. This resin has a number-average molecular weight of 5,000 dalton based on gel permeation chromatography using silicate resin standards. The triorganosiloxy units are trimethylsiloxy units and dimethylvinylsiloxy units, and the resin includes 1.4–2.2 weight percent silicon bonded vinyl radicals.

II. A resinous copolymeric siloxane prepared by (i) forming an acidic homogenous mixture of a silanol containing resinous copolymeric siloxane with $R_3SiO_{1/2}$ units and $SiO_{4/2}$ units; an organohydrogen polysiloxane with the formula $R_mH_nSiO_{(4-m-n)/2}$ where m and n are positive integers with a sum less than four, preferably 1.9–2.1; and an organic solvent, and (ii) heating the mixture to remove substantially all organic solvent. R has the meaning defined above. R can also be an arylalkyl radical such as betaphenylethyl and betaphenylpropyl; or a cycloaliphatic radical such as cyclopentyl, cyclohexyl, and cyclohexenyl.

III. A siloxane resin copolymer including $R_3SiO_{1/2}$ units and $SiO_{4/2}$ units in a mole ratio such that the number average molecular weight is 1,200 to 10,000 dalton. Preferably, the mole ratio is 0.7:1.0, and the number average molecular weight is 5,000. R is previously defined. The resin contains 2.5 weight percent silicon bonded OH groups. The resin may also contain $R_2SiO_{2/2}$ units and $RSiO_{3/2}$ units.

Such silicone resins are described in detail in numerous patents, among which are U.S. Pat. No. 2,504,388 (Apr. 18, 1950); U.S. Pat. No. 2,676,182 (Apr. 20, 1954); U.S. Pat. No. 2,706,190 (Apr. 12, 1955); U.S. Pat. No. 3,079,281 (Feb. 26, 1963); U.S. Pat. No. 4,310,678 (Jan. 12, 1982); and U.S. Pat. No. 4,322,518 (Mar. 30, 1982); which are all incorporated herein by reference.

Another suitable polysiloxane is a solid flake nonpolar silsesquioxane resin containing about 72.5 mole percent of $C_6H_5SiO_{3/2}$ units; about 27.5 mole percent of $C_3H_7SiO_{3/2}$ units; and about 5 percent by weight of OH groups. This type of resinous composition can be represented as $(PhSiO_{3/2})_x(PrSiO_{3/2})_yOH$ in which Ph is phenyl, Pr is propyl, and the ratio of x:y is about 7:3.

Another suitable polysiloxane is an aqueous silicone resin emulsion prepared by (A) hydrolyzing at least one organochlorosilane in the presence of an organic solvent to form a silicone resin hydrolyzate solution, whereby said silicone resin hydrolyzate has a residual hydrolyzable chloride content of 15-100 parts per million by weight; (B) stripping said hydrolyzate solution to reduce the organic solvent content thereof; and (C) emulsifying the solution resulting from step (B) in water with the aid of at least one anionic surfactant to form a uniform emulsion; with the proviso that the solvent content reduction according to step (B) provides an emulsion which forms a continuous film, when applied to a substrate and dried thereon.

The silicone hyrolyzate includes at least two units such as $MeSiO_{3/2}$ units, $Me_2SiO_{2/2}$ units, $PhMeSiO_{2/2}$ units, $PhSiO_{3/2}$ units, $Ph_2SiO_{2/2}$ units, and $PrSiO_{3/2}$ units; where Me is methyl, Ph is phenyl, and Pr is propyl, and in which the silicone has a hydroxyl content of 0.5-6.0 weight percent.

This aqueous silicone resin emulsion is described in U.S. Pat. No. 5,300,327 (Apr. 5, 1994), and the details on the method of preparing the aqueous silicone resin emulsion are set forth in U.S. patent application Ser. No. 07/839,419, filed Feb. 21, 1992, entitled "Method of Producing Aqueous Silicone Resin Emulsions", now abandoned. The '327 patent and the abandoned application are both assigned to the assignee of the present invention, and incorporated herein by reference.

Another optional ingredient that can be used according to our invention is a beading agent. Representative examples of some suitable beading agents that can be employed are stearates such as aluminum stearate and magnesium stearate; borate salts such as sodium borate; and hydrophobic silica. These materials assist in shedding films of water from a surface by forming droplets.

Another optional ingredient that can be used according to our invention is a catalyst. Representative examples of some suitable catalysts are metal titanates such as dibutyltin dilaurate (DBTDL) and dibutyltin diacetate (DBTDA); acids such as acetic acid; and bases including amines such as triethanolamine (TEA), morpholine, and diethylamine. Such catalysts are capable of converting alkoxysilanes to resinous products by hydrolysis and condensation.

Another optional ingredient that can be used according to our invention is a solvent. Representative examples of some suitable solvents are organic solvents such as isopropanol and mineral spirits; glycol ethers such as diethylene glycol butyl ether and propylene glycol methyl ether sold under the trademark Dowanol® by The Dow Chemical Company, Midland, Mich.; and polyglycols such as ethylene glycol and propylene glycol.

Another optional ingredient that can be used according to our invention is a surfactant. Most preferred is a combination of a low HLB nonionic surfactant and a high HLB nonionic surfactant. The low HLB nonionic surfactant has an HLB value less than 10.5, preferably less than 6.0. Representative emulsifiers in this category are: (a) Brij 52 which is a polyoxyethylene cetyl ether and a product of ICI Americas Inc., Wilmington, Del., having an HLB value of 4.9; (b) Brij 72 which is a polyoxyethylene stearyl ether and a product of ICI Americas Inc., Wilmington, Del., having an HLB value of 4.9; (c) Arlacel 60 which is sorbitan stearate and a product of ICI Americas Inc., Wilmington, Del., having an HLB value of 4.7; (d) Aldo® MS which is glycerol monostearate and a product and trademark of Lonza Inc., Fairlawn, N.J., having an HLB value of 3.9; (e) Aldo® PGHMS which is propylene glycol monostearate and a product and trademark of Lonza Inc., Fairlawn, N.J., having an HLB value of 3.0; (f) Mapeg® EGMS which is ethylene glycol monostearate and a product and trademark of PPG/Mazer, Gurnee, Ill., having an HLB value of 2.9; (g) Hodag DGS which is diethylene glycol monostearate and a product of Hodag Chemical Corp., Skokie, Ill., having an HLB value of 4.7; (h) Ethox SAM-2 which is a polyoxyethylene stearyl amine and a product of Ethox Chemicals, Inc., Greenville, S.C., having an HLB value of 4.9; and (i) Macol® SA-2 which is a polyoxyethylene stearyl ester and a product and trademark of PPG/Mazer, Gurnee, Ill., having an HLB value of 4.9. Fatty alcohols such as lauryl alcohol, myristyl alcohol, and cetyl alcohol, are considered nonionic surfactants with an HLB value of about one, and are included as a low HLB nonionic surfactant for purposes of our invention.

The high HLB nonionic surfactant has an HLB value greater than 15.0, and preferably greater than 17.0. Representative emulsifiers in this category are: (i) Brij 700 which is a polyoxyethylene stearyl ether and a product of ICI Americas Inc., Wilmington, Del., having an HLB value of 18.8; (ii) Mapeg® S-40K which is a polyoxyethylene monostearate and a product and trademark of PPG/Mazer, Gurnee, Ill., having an HLB value of 17.2; (iii) Macol® SA-40 which is steareth-40 and a product and trademark of PPG/Mazer, Gurnee, Ill., having an HLB value of 17.4; (iv) Triton® X-405 which is octylphenoxy polyethoxy ethanol and a product and trademark of Union Carbide Chem. & Plastics Co., Industrial Chemicals Div., Danbury, Conn., having an HLB value of 17.9; (v) Macol® SA-20 which is steareth-20 and a product and trademark of PPG/Mazer, Gurnee, Ill., having an HLB value of 15.4; and (vi) Tergitol® 15-S-20 which is a C11-C15 secondary alcohol ethoxylate and a product and trademark of Union Carbide Chem. & Plastics Co., Industrial Chemicals Div., Danbury, Conn., having an HLB value of 16.3.

The above surfactants are merely set forth for the purpose of identifying representative emulsifiers which may be employed in accordance with our invention. Other equivalent nonionic emulsifiers may also be substituted. Thus, it would be appropriate to use, for example, (i) other alcohol ethoxylates besides Brij 52, Brij 72, and Brij 700; (ii) other alkylphenol ethoxylates besides Triton® X-405; (iii) other glycerol esters of fatty acids besides Aldo® MS; and (iv) other glycol esters of fatty acids besides Aldo® PGHMS and Hodag DGS.

Thus, there can be included nonionic surfactants such as fluorocarbon based surfactants sold under the tradename Fluorad by the 3M Company, St. Paul, Minn.; block copolymers of ethylene oxide and propylene oxide sold under the trademark Pluronic® by BASF Corporation, Parsippany, N.J.; fatty acid esters sold under the tradename Span by ICI Surfactants, Wilmington, Del.; and ethoxylated fatty acid esters sold under the tradename Tween by ICI Surfactants, Wilmington, Del.

Certain anionic polymeric emulsifiers can be used in combination with these nonionic surfactants such as the crosslinked hydrophobically-modified polyacrylic acid polymers sold under the trademark Pemulen® by BF Goodrich, Brecksville, Ohio; and the crosslinked hydrophobically-modified polyacrylic acid copolymers sold under the trademark Carbopol® by BF Goodrich, Brecksville, Ohio. In addition, synthetic water-soluble resins such as polyvinyl alcohols $(C_2H_4O)_x$ can be employed. If desired, an anionic surfactant may be formed in situ by including in the mixture a base such as sodium hydroxide, triethanolamine, or morpholine; and a fatty acid such as stearic acid, oleic acid, or a tall oil fatty acid.

Another optional ingredient that can be used according to our invention is a preservative to reduce and or eliminate microbial activity in water based emulsions. Representative examples of some suitable preservatives are 5-chloro-2-methyl-4-isothiazolin-3-one sold under the tradename Kathon LX by the Rohm and Haas Co., Philadelphia, Penn.; and 1-(3-chloroallyl)-3,5,7-triaza-1-azoniaadamantane chloride sold under the trademark Dowicil® 75 by The Dow Chemical Company, Midland, Mich.

Another optional ingredient that can be used according to our invention is an antifoam. Representative examples of some suitable antifoams are silicone antifoams such as silica filled polydimethylsiloxane sold by the Dow Corning Corporation, Midland, Mich.; and organic antifoams such as hydrocarbon oils sold under the trademark Advantage® by Hercules Incorporated, Wilmington, Del.

Another optional ingredient that can be used according to our invention, where the composition is intended as an exterior coating, is a mildewcide, including materials classified as algicides, antimicrobials, bactericides, disinfectants, or fungicides; that are organic or inorganic materials which reduce biological activity on a substrate. Representative examples of some suitable mildewcides include the proprietary fungicide composition sold under the trademark Troysan® Polyphase® P-20T by the Troy Chemical Company, East Hanover, N.J.; diiodomethyl-p-tolylsulfone sold under the trademark Amical® by Angus Chemical Co., Buffalo Grove, Ill.; tribasic copper sulfate; and stabilized chlorine dioxide.

Another optional ingredient that can be used according to our invention, where the composition is intended as an exterior coating, is a UV absorber/UV light stabilizer. Representative examples of some suitable UV absorber/UV light stabilizers are substituted benzotriazole and hindered amines sold under the trademark Tinuvin® by Ciba-Geigy Corporation, Hawthorne, N.Y.

Water repellent compositions for treating surfaces according to our invention can be made by simply mixing together the various ingredients. Where a composition is desired in the form of an emulsion, it can be made by (i) making one emulsion of the several ingredients; (ii) making several emulsions each containing one or more of the ingredients, and combining the several emulsions; and (iii) following the procedure for (i) or (ii) and adding some of the ingredients directly to water. These mixtures and emulsions can be made using any suitable source of shear, such as a high speed stirrer, a homogenizer, sonolator, micro-fluidizer, Turello change can mixer, Ross mixer, or Eppenbach colloid mill. The procedure for making the mixtures and emulsions can include the direct addition of oil to water, or the indirect addition of water to oil. Preferably, the particle size of the active ingredient(s) in the discontinuous or internal phase should be between about 0.2 micrometers (um) to about 500 micrometers (um).

These water repellent compositions can be formulated as a concentrated emulsion having a high solids content for later dilution and direct application to a substrate; or they can be formulated as ready-to-use emulsions with low solids content for direct application to the substrate. The actual amount of water repellent composition employed will vary, depending upon the nature of the substrate being treated, but in general, it should be sufficient to provide the substrate with a coating containing about 3-40 percent by weight of the solids in the water repellent composition being applied.

Substrates suitable for treatment with water repellent compositions according to our invention include cellulosic surfaces such as wood, fabric, fiber, paper, and paperboard; masonry surfaces such as porous inorganic substrates including concrete, mortar, brick, stone, gypsum, stucco, terra cotta, adobe, plaster, limestone, marble, porcelain, and tile; and concrete building structures.

The method of application of our water repellent composition is preferably by topical treatment or topical coating of the substrate, but the use of these water repellent compositions can include their incorporation directly into a substrate during its manufacture, i.e., as an additive in a paper slurry, or as an ingredient in a concrete mix prior to its setting. When applied topically, for the best results, it is preferred that the substrate be treated when it is dry, but substrates can be treated when they are damp or wet.

Following are examples to illustrate our invention in more detail. In the examples, as well as in the accompanying Tables, all percentages are on a weight basis, unless indicated otherwise.

EXAMPLE I

Sample Preparation

Aqueous emulsion water repellent compositions were prepared by blending the various components at the indicated active levels shown below. In preparing these emulsions, the polybutylene and any non-water dispersible silicone component(s), were mixed until thoroughly combined, using a standard laboratory mixer. Air driven or electric driven mixers were used, depending upon the viscosity of each blend. The surfactant(s) were incorporated into the oil phase, or into the water phase, depending upon the nature of the surfactant(s). In some instances, one surfactant was incorporated into the water phase, and another surfactant was incorporated into the oil phase. The oil phase and the water phase were combined with vigorous mixing, until an oil-in-water emulsion, with the desired particle size was achieved, i.e., generally 0.2 micrometers (um) to 500 micrometers (um). The remaining water was slowly incorporated into the emulsion to achieve the desired actives level, i.e., generally 3–70 percent by weight. In some embodiments, the emulsion was then blended with a wax emulsion, and any other water-dispersible silicones. The resulting mixture was diluted to the desired final actives level, i.e., a concentrated emulsion having a high solids content for later dilution and direct application to a substrate, or a ready-to-use emulsion with low solids content for direct application to the substrate.

While it should be apparent that many different types of surfactant(s), and combinations of surfactant(s), can be employed in preparing these emulsions, nonionic surfactants Triton® X-45 and Triton® X-705 were found to be particularly effective.

The polybutylene (PIB) used in the examples, and in the accompanying Tables, was (i) a vinyl-terminated polybutylene having a number average molecular weight of about 1,340, which is a product sold under the trademark Indopol® H-300 by Amoco Chemical Company, Chicago, Ill.; (ii) a vinyl-terminated polybutylene having a number average molecular weight of about 2,160, which is a product sold under the trademark Indopol® H-1500 by Amoco Chemical Company, Chicago, Ill.; and (iii) an epoxidized polybutylene having an estimated molecular weight of about 1,000, which is a product sold under the trademark Vikopol® 64 by Elf Atochem North America, Philadelphia, Pa.

The optional wax ingredient used in these examples, and referred to in the accompanying Tables, was a 35% solids emulsion of a wax consisting of 50% polyethylene and 50% paraffin. Such wax emulsions are available commercially from SC Johnson & Sons Inc., Racine, Wis., under their trademark JONWAX® 125; and from Michelman Inc., Cincinnati, Ohio.

EXAMPLE II

Wood

An aqueous water repellent composition for the treatment of wood, representative of our invention, was prepared according to the procedure in Example I. The composition contained on a weight basis, the following active ingredients, with the balance of the composition to 100% being water:

| Amount (%) | Ingredient |
|---|---|
| 2.10 | PIB Indopol ® H-300 |
| 0.90 | Isobutyltriethoxysilane |
| 4.00 | Wax - Wax Emulsion, Michelman Inc. |
| 5.00 | Surfactant |

The surfactant was a mixture containing (i) a fatty acid nonionic surfactant sold under the trademark Actinol® FA-3 by the Arizona Chemical Company, Panama City, Fla.; (ii) triethanolamine; and (iii) Triton® X-705, a trademark of Union Carbide Chem. & Plastics Co., Industrial Chemicals Div., Danbury, Conn., for octylphenoxy polyethoxyethanol, a nonionic surfactant.

This composition did not contain an amine or quaternary ammonium functional silane.

EXAMPLE III

Wood

Another aqueous water repellent composition for the treatment of wood, representative of our invention, was prepared according to the procedure in Example I. The composition contained on a weight basis, the following active ingredients, with the balance of the composition to 100% being water:

| Amount (%) | Ingredient |
|---|---|
| 1.50 | PIB Indopol ® H-300 |
| 0.75 | Isobutyltriethoxysilane |
| 0.75 | Silicone Resin - Me$_2$SiO$_{2/2}$ and PhMeSiO$_{2/2}$ units |
| 4.00 | Wax - Wax Emulsion, Michelman Inc. |
| 5.00 | Surfactant |

The surfactant mixture used in Example II was used in this example. This composition also did not contain an amine or quaternary ammonium functional silane.

EXAMPLE IV

Comparison—Wood

An aqueous water repellent composition for the treatment of wood, NOT representative of our invention, was prepared according to the procedure in Example I. The composition contained on a weight basis, the following active ingredients, with the balance of the composition to 100% being water:

| Amount (%) | Ingredient |
|---|---|
| 2.51 | PIB Indopol ® H-300 |
| 1.24 | Isobutyltriethoxysilane |
| 1.25 | A mixture of water, methyltrimethoxysilane, and N-(2-aminoethyl) 3-aminopropyltrimethoxysilane |
| 5.00 | Surfactant - Tergitol ® TMN-6 |

This composition DID contain an amine or quaternary ammonium functional silane, i.e., N-(2-aminoethyl)-3-aminopropyl trimethoxysilane. It is representative of water repellent compositions taught by U.S. Pat. No. 5,421,866, referred to above, over which our invention is an improvement.

EXAMPLE V

Comparison—Wood

Another aqueous water repellent composition for the treatment of wood, NOT representative of our invention, was prepared according to the procedure in Example I. The composition contained on a weight basis, the following active ingredients, with the balance of the composition to 100% being water:

| Amount (%) | Ingredient |
|---|---|
| 2.50 | PIB Indopol ® H-300 |
| 2.50 | A mixture of water, methyltrimethoxysilane, and N-(2-aminoethyl)-3-aminopropyltrimethoxysilane |
| 5.00 | Surfactant - Tergitol ® TMN-6 |

This composition DID contain an amine or quaternary ammonium functional silane, i.e., N-(2-aminoethyl)-3-aminopropyl trimethoxysilane. It is also representative of water repellent compositions taught by U.S. Pat. No. 5,421,866, referred to above, over which our invention is an improvement.

The water repellent compositions prepared according to Examples II–V were used to treat wood, and evaluated for water repellency, according to three industry standard primary test methods. The three methods used were (i) The Swellometer Test Method according to Federal Specification TT-W-572B and ASTM D4446; (ii) The Gravimetric Test Method according to ASTM D5401; and (iii) The Beading Test Method.

The Swellometer Test Method—Fed. Spec. TT-W-572B or ASTM D4446

This test evaluates protection provided to wood by various treatments, by measuring both water pick-up, and dimensional stability of treated versus untreated wood samples. The wood samples were 0.25"×1.5"×10" cross-sectional wafers, cut from straight-grained, knot-free, flat-sawn, clear, average density, kiln-dried, Southern Pine sapwood. All wood wafers were conditioned at 50±5% relative humidity, and 70°±5° F. (21°±3° C.) until a constant weight (±0.5 g in 24 hours) and moisture content (about 12.5%) was reached. Moisture content was determined by ASTM D4442. The wood was dried in a 217°±5° F. (103°±2° C.) oven, and moisture content (MC) was calculated by the formula:

$$\% MC = \frac{(\text{original mass} - \text{over-dry mass}) \times 100}{\text{oven-dry mass}}$$

Wafers were removed from the conditioning room and immediately treated by soaking 3 minutes in water-based formulations, or 30 seconds in solvent-based formulations. Treated wafers were then placed on a raised screen or rack at about a 45° angle, and allowed to air dry at ambient conditions overnight. An untreated wafer taken from consecutive pieces of the same board was used as a control for each treated wafer. Sets of treated and untreated pairs were then placed in a chamber, and conditioned at 65±5% relative humidity, and 70°±5° F. (21°±3° C.) until constant weight was reached (about 7 days).

Wafers were placed in a swellometer test apparatus, which was then submerged in deionized water maintained at 75°±5° F. (24°±3° C.) for 30 minutes. The dimensional change of the wafer was measured by the swellometer gauge during the soak, and was used to calculate % Water Repellency (WR). After removal from the gauge, the wood was then weighed, and the % Water Exclusion (WE) was determined from the degree of weight gain.

The percent water repellency (% WR) was calculated by comparing the swell of the treated wafer to that of the untreated wafer with the formula:

$$\% \; WR = \frac{(\text{swell of control} - \text{swell of treated wafer}) \times 100}{\text{swell of control}}$$

The percent water exclusion (% WE) was calculated by comparing the weight gain of the treated wafer to the untreated wafer with the formula:

$$\% \; WE = \frac{(\text{H2O uptake of control} - \text{H2O uptake of treated wafer}) \times 100}{\text{weight gain of control}}$$

The Gravimetric Test Method according to ASTM D5401

The gravimetric test was used to evaluate the effectiveness of clear water repellent coatings on wood. The substrates were 2"×4"×6" straight-grained, knot-free, flat-sawn, kiln-dried, Ponderosa Pine sapwood boards, conditioned at 50±5% relative humidity, and 70°±5° F. (21°±3° C.) until a constant weight (±1 g in 24 hours) and moisture content (about 12.5%) was reached. Moisture content was determined by ASTM D4442 in the same manner as above.

After these conditions were met, the boards were removed from the conditioning room and immediately treated by soaking 3 minutes in water-based formulations, or 30 seconds in solvent-based formulations. The treated boards were placed on a raised rack and left to cure in the laboratory at ambient conditions overnight. Three control boards for each day of testing were left untreated and kept in the 50% humidity room. Boards were then equilibrated in the 50% humidity room until weight change in two successive 24 hour measurements was less than 0.5 g (6–7 days).

The treated and untreated boards were each weighed, and then allowed to float in distilled/deionized water maintained at 75°±5° F. (24°±3° C.) for 30 minutes, 15 minutes on each side, turning them over in between. The boards were removed, the excess water was wiped off, and each was re-weighed.

The percent Water Repellent Effectiveness (% WRE) was then calculated by comparing the average weight gain of the treated boards, to the average weight gain of the untreated controls, with the formula:

$$\% \; WRE = \frac{(\text{H2O uptake of control} - \text{H2O uptake of treated}) \times 100}{\text{H2O uptake of control}}$$

The Beading Test Method

The beading test was used to evaluate the beading ability of various samples on wood. The beading for each composition was tested using the gravimetric boards described above prior to their testing. Approximately 6–8 water droplets were dripped onto the board using an eye-dropper, and then the boards were sprayed with water. Beading was evaluated on a scale from 0–5, with 5 being exceptional beading with tight spherical beads, 3 being moderate beading with flatter irregular shaped beads, and 0 being no beading.

The Table below shows the results on wood for the water repellent compositions of Examples II–V in evaluations according to (i) The Swellometer Test Method, (ii) The Gravimetric Test Method, and (iii) The Beading Test Method.

TABLE I

| Example | Gravimetric % WRE | Swellometer % WE | Swellometer % WR | Beading 0–5 |
|---|---|---|---|---|
| II | 86 | 77 | 67 | 4+ |
| III | 88 | 78 | 70 | 4+ |
| IV | 61 | 6 | 1 | 3+ |
| V | 72 | 14 | 3 | 4 |

Water repellent compositions according to our invention in Examples II and III, were much more effective in all categories evaluated, as can be seen in Table I, in comparison to water repellent compositions NOT according to our invention, shown in Examples IV and V. In particular, note that the values for % Water Exclusion (WE) and % Water Repellency (WR) varied as much as 10–20 fold or more.

EXAMPLE VI

Sandstone

An aqueous water repellent composition for the treatment of sandstone, representative of our invention, was prepared according to the procedure in Example I. The composition contained on a weight basis, the following active ingredients, with the balance of the composition to 100% being water:

| Amount (%) | Ingredient |
|---|---|
| 1.00 | PIB Indopol® H-300 |
| 1.00 | PIB Indopol® H-1500 |
| 1.00 | Isobutyltriethoxysilane |
| 4.00 | Wax - Wax Emulsion, Michelman Inc. |
| 5.00 | Surfactant |

The surfactant was the same mixture used in Examples II and III, containing (i) Actinol® FA-3; (ii) triethanolamine; and (iii) Triton® X-705.

This composition did not contain an amine or quaternary ammonium functional silane.

EXAMPLE VII

Comparison—Sandstone

An aqueous water repellent composition for the treatment of sandstone, NOT representative of our invention, was prepared according to the procedure in Example I. This composition contained on a weight basis, the same active ingredients used in Example V, i.e., PIB Indopol® H-300; methyltrimethoxysilane; N-(2-aminoethyl)-3-aminopropyltrimethoxysilane; Tergitol® TMN-6; and water.

This composition DID contain an amine or quaternary ammonium functional silane, i.e., N-(2-aminoethyl)-3-aminopropyl trimethoxysilane. It is representative of water repellent compositions taught by U.S. Pat. No. 5,421,866, referred to above, over which our invention is an improvement.

EXAMPLE VIII

Mortar

An aqueous water repellent composition for the treatment of mortar, representative of our invention, was prepared according to the procedure in Example I. The composition contained on a weight basis, the same active ingredients used in Example VI, i.e., PIB Indopol® H-300; PIB Indopol® H-1500; isobutyltriethoxysilane; Michelman Inc., Wax Emulsion; and the surfactant was the same mixture used in Examples II, III, and VI, containing (i) Actinol® FA-3; (ii) triethanolamine; and (iii) Triton® X-705.

This composition did not contain an amine or quaternary ammonium functional silane.

EXAMPLE IX

Mortar

Another aqueous water repellent composition for the treatment of mortar, representative of our invention, was prepared according to the procedure in Example I. The composition contained on a weight basis, the following active ingredients, with the balance of the composition to 100% being water:

| Amount (%) | Ingredient |
|---|---|
| 28.00 | PIB Indopol ® H-300 |
| 10.00 | Isobutyltriethoxysilane |
| 40.00 | Silicone Resin - $Me_2SiO_{2/2}$ and $PhMeSiO_{2/2}$ units |
| 5.00 | Surfactant |

The surfactant was the same mixture used in Examples II, III, VI, and VIII, containing (i) Actinol® FA-3; (ii) triethanolamine; and (iii) Triton® X-705. This composition also did not contain an amine or quaternary ammonium functional silane.

EXAMPLE X

Comparison—Mortar

An aqueous water repellent composition for the treatment of mortar, NOT representative of our invention, was prepared according to the procedure in Example I. This composition contained on a weight basis, the same active ingredients used in Examples V and VII, i.e., PIB Indopol® H-300; methyltrimethoxysilane; N-(2-aminoethyl)-3-aminopropyl trimethoxysilane; Tergitol® TMN-6; and water.

This composition DID contain an amine or quaternary ammonium functional silane, i.e., N-(2-aminoethyl)-3-aminopropyl trimethoxysilane. It is representative of water repellent compositions taught by U.S. Pat. No. 5,421,866, referred to above, over which our invention is an improvement.

The water repellent compositions prepared according to Examples VI and VII were used to treat sandstone, and the water repellent compositions prepared according to Examples VIII-X were used to treat mortar, and evaluated for water absorption (WA), water exclusion (WE), and beading, according to industry standard primary test methods. The methods used were (i) The Federal Specification SS-W-110C, a test procedure for masonry, which covers sandstone and mortar; and (ii) The Beading Test Method referred to above.

Test Procedure—Masonry—Federal Specification SS-W-110C

This specification covers clear penetrating solutions which provide water repellency to exterior masonry materials such as sandstone and mortar. The water absorption (WA) characteristics of a substrate are evaluated by soaking each block in ¼" of water for three days. The results are reported as a percent water absorption (% WA) based on dry weight of the cube, and as percent water exclusion (% WE) based on difference in water uptake between treated and untreated cubes.

Duplicate substrates were treated for each emulsion prepared in Examples VI-X. Sandstone cubes were cut from Briar Hill sandstone to the dimensions of 1"×1"×4". Mortar cubes were made with Type I cement cured 28 days, and cut into 2" cubes. The face of each substrate was brushed with a wire brush, and the excess dust was blown off with air. The cubes were dried in an oven at 80° C.±5° C. until they reached a constant weight, i.e., varying less than 0.2 grams over a four hour period. After the cubes had reached a constant weight, they were allowed to cool to room temperature. The weight of each sandstone and mortar cube was determined within 0.1 g and recorded.

Untreated control cubes were placed in a quarter inch of water for 24 hours. Then the cubes were removed from the water, and excess water removed with a damp cloth. The wet weights were determined, and the amount of water absorbed was calculated as a percent of dry weight. The cubes were returned to the oven to dry until they reached a constant weight.

Once the untreated cubes had reached a constant weight, they were allowed to cool to room temperature, weighed, and immediately treated with the test composition for 30 seconds. The amount of coverage was determined by the difference of dry weight to wet weight, i.e., 151/grams of treatment×4.07=X ft²/gal. The treated cubes were placed on a rack in the laboratory and rotated every minute for the first hour. The cubes were allowed to cure at room temperature for 48 hours.

After 48 hours, the weight of each cube was determined, and the cubes were immersed in a quarter of an inch of water for 72 hours. The appearance of each cube was noted, as well as the substrate ability to bead water, prior to the cubes placement in water. The cubes were removed after 72 hours, and the excess water was removed with a cloth. The cubes were weighed, and the amount of water absorbed was calculated based on the dry weight of the cube. Calculations were made using the formulas:

% $WE=(C2-C1)-(S2-S1)+(C2-C1)\times 100$

% $WA=(S2-S1)+S1\times 100$ where C1 is the uncoated substrate before immersion; C2 is the uncoated substrate after immersion; S1 is the treated substrate before immersion; and S2 is the treated substrate after immersion.

The Table below shows the results on sandstone for the water repellent compositions of Examples VI and VII, in evaluations according to (i) Federal Specification SS-W-110C Test Procedure for Masonry, and (ii) The Beading Test Method.

TABLE II

| Example | SS-W-110C % WA | SS-W-110C % WE | Beading 0–5 |
|---|---|---|---|
| VI | 0.6 | 92 | 4 |
| VII | 8.8 | –20 | 0 |

Water repellent compositions according to our invention in Example VI, were again much more effective in all categories evaluated, as can be seen in Table II, in comparison to water repellent compositions NOT according to our invention, shown in Example VII. In particular, note that the values for % Water Absorption (WA) and % Water Exclusion (WE) varied significantly, and that beading was much improved.

The Table below shows the results on mortar for the water repellent compositions of Examples VIII–X, in evaluations according to (i) Federal Specification SS-W-110C Test Procedure for Masonry, and (ii) The Beading Test Method.

TABLE III

| Example | SS-W-110C % WA | SS-W-110C % WE | Beading 0–5 |
|---|---|---|---|
| VIII | 1.6 | 80 | 1+ |
| IX | 0.4 | 95 | 1 |
| X | 7.9 | 11 | 2 |

Water repellent compositions according to our invention in Examples VIII and IX, were again much more effective, as can be seen in Table III, in comparison to water repellent compositions NOT according to our invention, shown in Example X. In particular, note that the values for % Water Exclusion (WE) varied significantly.

The following examples further illustrate our invention, where the organic polymer used in preparing the water repellent composition was an alkyd resin, instead of polybutylene, which was used in Examples II–X.

EXAMPLE XI

Wood

An aqueous water repellent composition for the treatment of wood, representative of our invention, was prepared according to the procedure in Example I. The composition contained on a weight basis, the following active ingredients, with the balance of the composition to 100% being water:

| Amount (%) | Ingredient |
|---|---|
| 2.00 | Medium oil soya modified alkyd resin |
| 1.00 | Isobutyltriethoxysilane |
| 4.00 | Wax - Wax Emulsion, Michelman Inc. |
| 5.00 | Surfactant |

The surfactant was the same mixture used in Examples II, III, VI, VIII, and IX, containing (i) Actinol® FA-3; (ii) triethanolamine; and (iii) Triton® X-705. This composition did not contain an amine or quaternary ammonium functional silane.

EXAMPLE XII

Comparison—Wood

An aqueous water repellent composition for the treatment of wood, NOT representative of our invention, was prepared according to the procedure in Example I. The composition contained on a weight basis, the following active ingredients, with the balance of the composition to 100% being water:

| Amount (%) | Ingredient |
|---|---|
| 2.00 | Medium oil soya modified alkyd resin |
| 1.00 | Isobutyltriethoxysilane |
| 4.00 | Wax - Wax Emulsion, Michelman Inc. |
| 0.20 | N-(2-aminoethyl)-3-aminopropyltrimethoxysilane |
| 5.00 | Surfactant |

The surfactant was the same mixture used in Examples II, III, VI, VIII, IX, and XI, containing (i) Actinol® FA-3; (ii) triethanolamine; and (iii) Triton® X-705.

This composition DID contain an amine or quaternary ammonium functional silane, i.e., N-(2-aminoethyl)-3-aminopropyl trimethoxysilane.

The Table below shows the results on wood for the water repellent compositions of Examples XI and XII in evaluations according to (i) The Swellometer Test Method, (ii) The Gravimetric Test Method, and (iii) The Beading Test Method, all referred to previously.

TABLE IV

| Example | Gravimetric % WRE | Swellometer % WE | Swellometer % WR | Beading 0–5 |
|---|---|---|---|---|
| XI | 89 | 59 | 32 | 3+ |
| XII | 89 | 64 | 49 | 4 |

Water repellent compositions according to our invention in Example XI, were equivalent in comparison to water repellent compositions NOT according to our invention, shown in Example XII.

Other variations may be made in the compounds, compositions, and methods described herein, without departing from the essential features of our invention. The forms of our invention are exemplary only, and not intended as limitations on its scope, as defined in the appended claims.

We claim:

1. A composition comprising a mixture formed by combining water; an organic polymer selected from the group consisting of polybutylene and an alkyd resin; and an alkoxysilane of the formula $R_nSi(OR')_{4-n}$ where R is an alkyl radical of 1–10 carbon atoms, an alkenyl radical having 2–8 carbon atoms, phenyl, chloropropyl, or trifluoropropyl, n is 1 or 2, and R' is an alkyl radical having 1–6 carbon atoms; the composition being free of amine or quaternary ammonium functional silanes.

2. A composition according to claim 1 in which the alkoxysilane is selected from the group consisting of methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane, butyltriethoxysilane, hexyltrimethoxysilane, dimethyldimethoxysilane, dimethyldiethoxysilane, diethyldimethoxysilane, diisobutyldimethoxysilane, phenyltrimethoxysilane, dibutyldiethoxysilane, and dihexyldimethoxysilane.

3. A composition according to claim 1 in which the organic polymer is a polybutylene polymer or oligomer having a number average molecular weight of 200–2,300, and contains at least one terminal group selected from the group consisting of epoxy, halide, alkoxyphenylene, hydroxyl, carboxyl, chlorosilyl, isocyanato, amino, and amido.

4. A composition according to claim 1 in which the organic polymer is an alkyd resin selected from the group consisting of long oil alkyd resins containing more than 55 percent by weight of fatty acid oil, medium oil alkyd resins containing 35–55 percent by weight of fatty acid oil, short oil alkyd resins containing less than 35 percent by weight of fatty acid oil, tall oil fatty acid alkyd resins, soybean oil alkyd resins, linseed oil alkyd resins, vegetable oil alkyd resins, marine oil alkyd resins, coconut oil alkyd resins, castor oil alkyd resins, rosin modified alkyd resins, phenolic modified alkyd resins, rosin-phenolic modified alkyd resins, hydrocarbon modified alkyd resins, styrene modified alkyd resins, and silicone modified alkyd resins.

5. A composition according to claim 1 further comprising at least one additional component selected from the group consisting of an organic wax, a polysiloxane, a beading agent, a catalyst, a solvent in an amount to provide the composition with a content of volatile organic compounds less than about 600 grams per liter, a surfactant, a preservative, an antifoam agent, a mildewcide, and a UV absorber/UV light stabilizer.

6. A composition according to claim 5 in which the additional component is a polysiloxane which is a silicone resin or silanol terminated polydimethylsiloxane.

7. A composition according to claim 5 in which the additional component is at least two surfactants, one surfactant having an HLB less than 10.5, and the other surfactant having an HLB more than 15.

8. A composition according to claim 7 in which the composition is emulsified.

9. A method of rendering a surface water repellent comprising applying to the surface the composition according to claim 1.

10. The method according to claim 9 in which the composition is applied to a cellulosic or masonry surface.

* * * * *